3,099,689
Patented July 30, 1963

3,099,689
HYDROCARBON METAL CATALYST IN PREPARATION OF FORMAMIDES
Hoyt J. Cragg, Baton Rouge, La., assignor to Ethyl Corporation, New York, N.Y., a corporation of Virginia
No Drawing. Filed May 31, 1961, Ser. No. 113,672
15 Claims. (Cl. 260—561)

This invention relates to a novel and useful process for the preparation of hydrocarbon formamides and, specifically, to novel catalysts for this synthesis.

The preparation of hydrocarbon formamides by the reaction of the corresponding primary or secondary amines with carbon monoxide has long been known. This reaction has invariably required the application of carbon monoxide pressures of the order of 50–300 atmospheres or above. Pressures of this order require the use of special and expensive equipment as well as the use of more elaborate safety precautions in operation. A considerable variety of substances have been tested as catalysts for the above reaction but, whatever their other advantages, they have not materially reduced the operating pressure required for the carbonylation reaction. It is a specific and valuable property of the catalysts of this invention that they very markedly reduce the carbon monoxide pressure requirement of the above carbonylation reaction and thereby eliminate the need for specialized and costly high-pressure equipment. Other advantages will be apparent as the discussion proceeds.

Accordingly, it is an object of this invention to provide a new and useful method for the preparation of hydrocarbon formamides. Another object is to provide a method for the preparation of hydrocarbon formamides which does not require the application of extremely high pressures of carbon monoxide. A further object is to provide a method for the preparation of hydrocarbon formamides which does not require the application of specialized and expensive reaction equipment. Still another object is to provide novel and effective catalysts for the carbonylation reaction of this invention. Other important objects of this invention will become apparent hereinafter.

It has now been found that the above and other objects of this invention can be accomplished more advantageously by the reaction of a primary or secondary amine with carbon monoxide at elevated temperature and pressure and in the presence of an organo-metallic compound of a transition metal as a catalyst. The carbonylation reaction can, if desired, be carried out in the absence of a solvent but the use of a solvent improves the contact between the reactants, reduces the carbon monoxide pressure requirement and increases the reaction rate. In a particular embodiment of the invention, a secondary alkyl amine, especially one wherein the alkyl groups contain up to and including about 8 carbon atoms, is reacted with carbon monoxide under elevated pressure and temperature in the presence of a hydrocarbon manganese compound. It has been found that best results are obtained at temperatures between 150 and 250° C. and at pressures of 300–900 pounds per square inch gauge. Therefore, a particularly preferred embodiment of the invention comprises the reaction of carbon monoxide with di-n-butyl amine in the presence of bis-methylcyclopentadienylmanganese as a catalyst. The preferred reaction temperature is about 190° C. and the preferred carbon monoxide pressure is in the neighborhood of 500 pounds per square inch gauge.

The invention will be more fully understood by reference to the following illustrative examples in which all parts and percentages are by weight.

*Example I*

A dispersion of 5.8 parts by weight of metallic sodium in 192 parts of di-n-butyl amine was prepared by heating the mixed components under nitrogen to a temperature above the melting point of sodium and agitating the mixture by means of a high-speed stirrer. The dispersion was heated to 120° C. and 24 parts of freshly prepared monomeric methyl cyclopentadiene was added over a 10-minute period, during which the temperature rose to 140°, the sodium dissolved completely and gas evolution ceased. The reaction mixture was heated to reflux for an additional 30 minutes. Ther 16.4 parts of manganese chloride was added and reflux was continued for 2 hours longer.

The product was transferred to an autoclave, and the autoclave pressurized with carbon monoxide at 500–800 pounds per square inch gauge and heated for 2 hours at 163–170° C. Additional carbon monoxide was introduced from time to time to replace that absorbed. At the end of the 2-hour period, during which the total pressure drop amounted to 1780 pounds, the autoclave was cooled and vented.

The carbonylation product was transferred to a still, followed by 50 parts of a high-boiling aromatic petroleum fraction consisting largely of methylated naphthalenes to serve as a chaser. Distillation yielded di-n-butyl formamide, boiling at 130–132° C. under a pressure of 20 millimeters of mercury.

*Analysis.*—Calculated C 68.79, H 12.10, N 8.92. Found C 68.70, H 12.49, N 8.08.

*Example II*

163 parts of di-n-butyl amine, previously dried and distilled, was treated with 2.50 parts of bis-cyclopentadienyl manganese, prepared from cyclopentadienyl sodium and manganese chloride. The mixture was transferred to a bomb and was reacted at a temperature of 165–169° C. with carbon monoxide under a pressure varying from 300 to 500 pounds per square inch gauge. The total pressure drop amounted to 1275 pounds per square inch. After the bomb was cooled and vented, N,N-di-butyl formamide was obtained.

*Example III*

To 62 parts of methyl amine, 8.90 parts of bis-cyclopentadienyl titanium is added. The mixture is heated with carbon monoxide under a pressure of 300–600 pounds per square inch gauge for 6–7 hours at 150–163° C. The product obtained is N-methyl formamide.

*Example IV*

Dimethyl amine (90 parts) and bis-cyclopentadienyl ruthenium (11.1 parts) are combined, introduced into a pressure reactor and pressurized with carbon monoxide at 400–500 pounds per square inch. The reactor is heated for 5 to 6 hours at 160 to 168° C., during which time fresh carbon monoxide is introduced to replace that absorbed. A good yield of N,N-dimethyl formamide is obtained.

*Example V*

146 parts of diethyl amine is added to 11.7 parts of bis-cyclopentadienyl rhodium in a Magne Dash reactor. Carbon monoxide is introduced under a pressure of 400–550 pounds per square inch. Reaction for 5 hours at 175–190° C. results in the formation of N,N-diethyl formamide in good yield.

*Example VI*

When 118 parts of isopropyl amine is mixed with 9.1 parts of bis-cyclopentadienyl vanadium suspended in 500 parts of the dimethyl ether of diethylene glycol and the mixture is heated to a temperature of 180–185° C. with carbon monoxide under a pressure of 475–600 pounds per square inch for a period of 5 hours, N-isopropyl formamide is obtained.

Example VII 11.8 parts of bis-cyclopentadienyl palladium is added to a solution of 258 parts of diisobutyl amine in 1000 parts of tetrahydrofuran. The solution is heated to 188–194° C. with carbon monoxide under a pressure of 600–800 pounds per square inch for a period of 4.5 hours. The reactor is cooled and vented and the solvent is removed by distillation. The product is N,N-diisobutyl formamide.

Example VIII

Methyl ethyl amine (118 parts) is dissolved in 500 parts of dioxane and 16.0 parts of bis-cyclopentadienyl osmium is added. The mixture is heated to 165–177° C. with carbon monoxide under a pressure of 650–800 pounds per square inch for a period of 5–6 hours. The product is methyl ethyl formamide.

Example IX

When 258 parts of n-octyl amine is dissolved in 1000 parts of dioxolane, 10.4 parts of dibenzene chromium is added, carbon monoxide is introduced under a pressure of 700–900 pounds per square inch and the mixture is heated for 1.5 hours at 210–221° C., N-octyl formamide is obtained.

Example X

A mixture of 932 parts of dicetyl amine dissolved in 4000 parts of methyl formamide and 11.4 parts of bis-cyclopentadienylmolybdenum dihydride is pressurized with 750–900 pounds per square inch of carbon monoxide and heated to 212–225° C. for a period of 1.5 hours, N,N-dicetyl formamide is obtained.

Example XI 86 parts of vinyl amine is dissolved in 300 parts of ethyl formamide and 15.8 parts of bis-cyclopentadienyltungsten dihydride is added. The resulting mixture is heated with carbon monoxide under a pressure of 700–850 pounds per square inch at 160–168° C. for a period of 2 hours. N-vinyl formamide is thus obtained.

Example XII

A mixture of 338 parts of diphenyl amine dissolved in 1300 parts of N-butyl formamide and 10.7 parts of bis-methylcyclopentadienyl manganese is heated at 172–178° C. with carbon monoxide under a pressure of 450–650 pounds per square inch for 3½ hours. The product is N,N-diphenyl formamide.

Example XIII 242 parts of 3,4-xylidine and 9.30 parts of bis-cyclopentadienyl iron (ferrocene) are mixed and pressurized with carbon monoxide at 550–700 pounds per square inch. Reaction for 3–4 hours at 174–182° C. results in the formation of 3,4-xylyl formamide. This can be purified by recrystallization from ethylene glycol.

Example XIV 395 parts of dibenzyl amine is dissolved in 1600 parts of molten acetamide and 14.5 parts of diindenyl cobalt is added. The mixture is heated to 175–183° C. and carbon monoxide is introduced under a pressure of 575–725 pounds per square inch. The reaction is continued for 3½ hours and the product is recrystallized from diethyl ether. N,N-dibenzyl formamide is obtained.

Example XV

When 270 parts of mesidine and 14.4 parts of diindenyl nickel are mixed with 600 parts of morpholine and heated under 625–700 pounds pressure with carbon monoxide at a temperature of 189–197° C. for 2½ hours, N-mesityl formamide is obtained.

Example XVI

To 214 parts of methyl aniline, dissolved in 1400 parts of benzene, 15.9 parts of bis-cyclopentadienylrhenium hydride is added. The mixture is heated to 183–195° C. under a pressure of 525–750 pounds per square inch of carbon monoxide for a period of 3 hours. The product, recrystallized from ethylene glycol, is N-methyl-N-phenyl formamide.

Example XVII

When 186 parts of aniline and 10.70 parts of bis-methylcyclopentadienyl iron are mixed and the mixture is heated at 207–215° C. for 3 to 4 hours with carbon monoxide under a pressure of 500–600 pounds per square inch, a good yield of N-phenyl formamide is obtained.

Example XVIII

Dicyclohexyl amine (363 parts) and bis-cyclopentadienyl iron (9.30 parts) are heated together at 215–222° C. in the presence of carbon monoxide at a pressure of 550–650 pounds per square inch for a period of 1 to 2½ hours. N,N-dicyclohexyl formamide is obtained.

Example XIX

A solution of 270 parts of cumidine in 1100 parts of toluene is mixed with 9.5 parts of bis-cyclopentadienyl cobalt and the mixture is heated for 3–4 hours at 190–205° C. in the presence of carbon monoxide under a pressure of 575–650 pounds per square inch. The product recrystallized from benzene is N-para-cumenyl formamide.

Example XX

When 539 parts of di-α-naphthyl amine is mixed with 14.4 parts of diindenyl nickel and the mixture is pressurized with 600–800 pounds per square inch of carbon monoxide and heated for 6–7 hours at 235–250° C., N,N-di-α-naphthyl formamide is obtained. The product may be recrystallized from ethylene glycol.

Example XXI 19.3 parts of difluorenyl manganese is added to a solution of 198 parts of cyclohexyl amine in 800 parts of dioxane and the mixture is pressurized with carbon monoxide at 750–900 pounds per square inch. Reaction for 3–4 hours at 190–203° C. results in the formation of N-cyclohexyl formamide.

Example XXII

Cyclopentadienyliron dicarbonyl dimer, prepared from cyclopentadiene and 19.6 parts of iron pentacarbonyl dimer by heating the mixture under pressure to a temperature of 175–200° C., is converted, by treatment with sodium amalgam, to the sodium derivative. The latter is added to a solution of 370 parts of dodecyl amine in 1500 parts of tetrahydrofuran and the mixture is pressurized with carbon monoxide at 650 to 800 pounds per square inch. The pressure reactor is heated to 185–190° C. and maintained at that temperature for two to three hours. The product is N-dodecyl formamide.

The above examples have been presented by way of illustration and it is not intended to limit the scope of the invention thereby. Employing the procedures illustrated therein and the process of this invention, other products are produced by appropriate substitution of the amine reactant described herein. Thus, employing the process of this invention, the following products are also produced: N,N-di-methyl formamide, N-ethyl-N-hexyl formamide, N-tolyl formamide, N,N-diallyl formamide, N-neopentyl formamide, N,N-diphenethyl formamide, N-(methylcyclopentyl) formamide, N-β-naphthyl formamide, N-methyl-N-vinyl formamide and N-butyl-N-octyl formamide.

As indicated above, the reactions of this invention are usually carried out by combining the components in a pressure vessel in the presence or absence of a solvent and in the presence of a suitable catalyst. The amine component may be a primary alkyl, cycloalkyl, aryl, alkaryl, aralkyl or alkenyl amine or a secondary amine containing any one or two of the foregoing types of hydrocarbon radicals.

Examples of these amines include: dimethyl amine, ethyl amine, methyl n-butyl amine, ethyl isopropyl amine, n-nonyl amine, hendecyl amine, tetradecyl amine, 2-ethyl hexyl amine, aniline, N-methyl aniline, N-ethyl aniline, benzyl amine, $\beta$-phenethyl amine, o-toluidine, mesidine, phenyl benzyl amine, $\beta$-naphthyl amine, 4-xenyl amine, 2-amino-p-dioxane, p-tert-butyl aniline, p-benzohydryl aniline, p-anisidine, $\alpha$-amino toluene, pseudocumidine, 4-amino-2-methyl heptane, $\alpha$-methyl phenethyl amine (benzedrine) and 2,4,6-tribromo aniline. In general, such amines are preferably hydrocarbon amines having up to and including about 18 carbon atoms or higher in each hydrocarbon group. Of these reactants the lower alkyl amines, especially secondary amines having up to and including about 6 carbon atoms in each alkyl group, are preferred because of their economy and ease of preparation and di-n-butyl amine is particularly preferred for the foregoing reasons and because it is an easily handled liquid under ordinary operating conditions.

The catalysts for use in the reactions of this invention are organometallic compounds of metals of groups IV–B, V–B, VI–B, VII–B and VIII of the periodic system of the elements. The hydrocarbon compounds of these transition metals are generally employed. These compounds are characterized by having at least one hydrocarbon group attached to the transition metal, such hydrocarbon group being of the so-called electron donor type, exemplified by the cyclopentadienyl, alkyl cyclopentadienyl, indenyl and fluorenyl groups, and the like. The remaining valences of the transition metal can be satisfied by any of a variety of ligands, including carbonyl, nitrosyl, halide, alkali and other metal, hydrocarbon, halohydrocarbon and other ligands. Compounds of these types exhibit, in general, marked stability under ordinary operating conditions. Examples of these compounds include: bis-methylcyclopentadienyl iron, bis-indenyl iron, bis-cyclopentadienyl cobalt, bis-cyclopentadienyl nickel, bis-tetrahydroindenyl iron, bis-cyclopentadienyl ruthenium, bis-cyclopentadienyl palladium, bis-indenyl nickel, bis-indenyl ruthenium, bis-ethylcyclopentadienyl osmium, bis-methylcyclopentadienyl manganese, bis-cyclopentadienyl chromium, ditoluene chromium, bis-cyclopentadienyl vanadium, cyclopentadienyl titanium trichloride, cyclopentadienyl vanadium tetracarbonyl, cyclopentadienyl vanadium oxydichloride, cyclopentadienyl chromium bromide acetylacetonate, cyclopentadienyl molybdenum tricarbonyl hydride, cyclopentadienyl tungsten dicarbonyl nitrosyl, cyclopentadienyl chromium dinitrosyl chloride, cyclopentadienyl chromium dinitrosyl thiocyanate, cyclopentadienyl phenyl chromium dinitrosyl, cyclopentadienyl molybdenum tricarbonyl dimer, bis-cyclopentadienyl tungsten tricarbonyl mercury, cyclopentadienyl chromium tricarbonyl, dibenzene chromium, cyclopentadienyl molybdenum tricarbonyl sodium, acetyl cyclopentadienyl manganese tricarbonyl, indenyl manganese tricarbonyl, bis-(cyclopentadienyl manganese dicarbonyl nitrosyl) chloroplatinate, cyclopentadienyl rhenium dicarbonyl isoprene, cyclopentadienyl iron dicarbonyl trimethylsilane, tetrahydroindenyl iron dicarbonyl dimer, cyclopentadienyl iron dicarbonyl cyanide, cyclopentadienyl rhodium cycloocta-1,5-diene, cyclopentadienyl nickel nitrosyl and cyclopentadienyl nickel carbonyl iodide.

Of the foregoing catalyst compounds, the simple binary cyclopentadienyl transition metal compounds are preferred because of their relatively high stability, and bis-methylcyclopentadienyl manganese and bis-cyclopentadienyl iron (ferrocene) are particularly preferred because of their economy, stability, and ease of preparation.

As previously indicated, the reactions of this invention can be carried out in the presence or absence of solvents. In reactions of low molecular weight amines, no solvent is required since reaction rate and yield are normally satisfactory in the absence of such solvent. In reactions involving amines of higher molecular weight, however, the use of a solvent improves contact between the reactants with resultant increase in yield, reaction rate and smoothness of operation. Thus, in these instances, it is preferable to employ a solvent. Suitable solvents include aromatic hydrocarbons such as benzene and toluene, ethers such as dimethyl ether of diethylene glycol, tetrahydrofuran and dioxane and amides such as formamide and ethyl formamide and the like produced according to the process. The preferred solvent is that formamide which is identical with the desired product since the use of this solvent eliminates the need for a separation step. The proportion of solvent may vary from about one to about ten parts of solvent per part of amine reactant used. Both the solvents and the reactants should preferably be anhydrous since the presence of even traces of water is sufficient, in most instances, to destroy the catalyst. However, the deleterious effects of such traces can be overcome by the use of an excess of catalyst.

In carrying out the reactions of this invention, the carbon monoxide reactant is normally used in excess because of its mass action effect in shifting the equilibrium of the reaction in the direction of the desired product and because of its economy and ready availability. However, the proportions employed can vary from a 100 percent or greater excess of the amine reactant to a 100 percent or greater excess of the carbon monoxide reactant. The proportion of catalyst employed can vary from less than 0.01 mole percent to more than 1 mole percent, and higher, based on the amine. A concentration of 0.025 percent to 0.035 percent on a molar basis is preferred because smaller concentrations give slower reaction rates and larger amounts are not of sufficient practical advantage.

The reaction of this invention may be carried out at any temperature and pressure within the range of stability of the reactants and products. Temperatures ranging from about 150 to about 250° C. and pressures ranging from about 250 to 900 pounds per square inch gauge are generally employed, however. Ordinarily, temperatures of 165 to 200° C. and pressures of 300 to 800 pounds per square inch are used for the best results.

The lower alkyl formamides are liquids which are distillable without decomposition and can be purified by such distillation suitably under normal or reduced pressure. The normally solid higher formamides of this invention are soluble in and can be purified by recrystallization from a variety of organic solvents. Specifically, simple aromatic solvents such as benzene or toluene, alcohols such as ethylene glycol and ethers such as diethylether and their mixtures are found to be satisfactory.

As stated above, the compounds produced by the process of this invention are useful reagents in organic synthesis. In particular, they are active formylating agents suitable for the conversion, e.g., of aryl ethers to substituted aldehydes. These compounds are highly versatile agents having a wide variety of applications, for example, the lower hydrocarbon formamides are exceptional ionizing solvents or reaction media. For example, N,N-dimethyl formamide reacts with nitrile-containing vinylidene polymers to produce a polyelectrolyte useful as a soil agglomerant.

The hydrocarbon formamides can be nitrosylated with nitric acid to produce nitramines in good yields. Furthermore, they can be reacted with ethylenic lithium compounds to produce ethylenic aldehydes. The lower alkyl formamides can be used as solvents in the formation of acrylonitrile polymers and as softeners for paper, animal glues and water-soluble gums. They are useful extractants in the recovery of ethylene and acetylene from gas streams. They may be employed as synergists for allethrin insecticides, as accelerating agents in azo dye preparation, as complexing agents for hydrogen chloride, sulfur trioxide and boron trifluoride and as catalysts in gasoline combustion. They have application in the preparation of medicinals, anesthetics and hypnotics, flotation agents, rubber accelerators, detergents and other cleaning compounds.

Other uses for the products of the novel process of this invention will now be evident.

Having thus described the novel process of this invention and the products obtained by said process it is not intended to be limited except as set forth in the following claims.

I claim:

1. In the process for the preparation of a hydrocarbon formamide by the reaction of a hydrocarbon amine with carbon monoxide at an elevated temperature of 150° to 250° C. and an elevated pressure of 300 to 900 pounds per square inch gauge, the improvement which comprises carrying out said reaction in the presence of a hydrocarbon metal compound of a transition metal as a catalyst, the hydrocarbon radical of said hydrocarbon metal compound being selected from the group consisting of aromatic hydrocarbon radicals and of unsubstituted and alkyl-substituted cyclopentadienyl hydrocarbon radicals.

2. In the process for the preparation of a hydrocarbon formamide by the reaction of a hydrocarbon amine with carbon monoxide at an elevated temperature of 150° to 250° C. and an elevated pressure of 300 to 900 pounds per square inch gauge, the improvement which comprises carrying out said reaction in the presence of a hydrocarbon metal compound of a transition metal as a catalyst, the hydrocarbon radical of said hydrocarbon metal compound being selected from the group consisting of aromatic hydrocarbon radicals and of unsubstituted and alkyl-substituted cyclopentadienyl hydrocarbon radicals, and the said transition metal being selected from the groups IV–B, V–B, VI–B, VII–B, and VIII of the periodic system of the elements.

3. The process of claim 1 further defined in that the hydrocarbon formamide is an N,N-dihydrocarbon formamide and the hydrocarbon amine is an N,N-dihydrocarbon amine.

4. The process of claim 1 further defined in that the hydrocarbon amine is an N,N-dialkyl amine.

5. The process of claim 1 further defined in that the hydrocarbon amine is N,N-di-n-butyl amine.

6. The process of claim 2 wherein the hydrocarbon metal compound is a hydrocarbon manganese compound.

7. The process of claim 2 wherein the hydrocarbon metal compound is bis-methylcyclopentadienyl manganese.

8. The process of claim 2 wherein the hydrocarbon metal compound is a hydrocarbon iron compound.

9. The process of claim 2 wherein the hydrocarbon metal compound is bis-cyclopentadienyl diiron tetracarbonyl.

10. The process of claim 2 wherein the hydrocarbon metal compound is sodium cyclopentadienyl iron dicarbonyl.

11. The process of claim 2 wherein the hydrocarbon metal compound is bis-cyclopentadienyl titanium dichloride.

12. The process of claim 2 wherein the hydrocarbon metal compound is bis-cyclopentadienyl nickel.

13. The process of claim 2 wherein the hydrocarbon metal compound is bis-cyclopentadienyl cobalt.

14. The process of claim 2 wherein the hydrocarbon metal compound is selected from the group consisting of bis(cyclopentadienyl)manganese compounds and bis(alkyl-substituted cyclopentadienyl)manganese compounds.

15. In the process for the preparation of N,N-di-n-butyl formamide which comprises the reaction of N,N-di-n-butyl amine with carbon monoxide at an elevated temperature of 150–180° C. and at a pressure of 30–60 atmospheres, the improvement which comprises carrying out the said reaction in the presence of bis(methylcyclopentadienyl)-manganese as a catalyst.

References Cited in the file of this patent
UNITED STATES PATENTS
2,793,211   Cicero et al. _____ May 21, 1957

UNITED STATES PATENT OFFICE
CERTIFICATE OF CORRECTION

Patent No. 3,099,689                                  July 30, 1963

Hoyt J. Cragg

It is hereby certified that error appears in the above numbered patent requiring correction and that the said Letters Patent should read as corrected below.

Column 2, line 34, for "165-169° C." read -- 165-190° C. --.

Signed and sealed this 7th day of April 1964.

(SEAL)
Attest:
ERNEST W. SWIDER

Attesting Officer

EDWARD J. BRENNER

Commissioner of Patents